(12) United States Patent
Graue et al.

(10) Patent No.: US 7,222,673 B2
(45) Date of Patent: May 29, 2007

(54) PRODUCTION OF FREE GAS BY GAS HYDRATE CONVERSION

(75) Inventors: Arne Graue, Godvik (NO); Bjorn Kvamme, Bergen (NO); David R. Zornes, Bertlesville, OK (US); James C. Stevens, Bartlesville, OK (US); James J. Howard, Bartlesville, OK (US); Bernard A. Baldwin, Bartlesville, OK (US)

(73) Assignee: ConocoPhilips Company, Houston, TX (US)

( * ) Notice: Subject to any disclaimer, the term of this patent is extended or adjusted under 35 U.S.C. 154(b) by 122 days.

(21) Appl. No.: 10/948,431

(22) Filed: Sep. 23, 2004

(65) Prior Publication Data

US 2006/0060356 A1 Mar. 23, 2006

(51) Int. Cl.
*E21B 43/25* (2006.01)
*E21B 43/295* (2006.01)

(52) U.S. Cl. .................... 166/305.1; 166/371

(58) Field of Classification Search .............. None
See application file for complete search history.

(56) References Cited

U.S. PATENT DOCUMENTS

| | | | |
|---|---|---|---|
| 4,920,752 A * | 5/1990 | Ehrsam | 62/46.1 |
| 5,261,490 A * | 11/1993 | Ebinuma | 166/266 |
| 5,950,732 A | 9/1999 | Agee et al. | |
| 6,028,235 A | 2/2000 | Heinemann et al. | |
| 6,214,175 B1 | 4/2001 | Heinemann et al. | |
| 6,267,849 B1 | 7/2001 | Taylor et al. | |
| 6,978,837 B2 * | 12/2005 | Yemington | 166/303 |
| 2003/0178195 A1 | 9/2003 | Agee et al. | |
| 2004/0200618 A1 | 10/2004 | Piekenbrock | |

FOREIGN PATENT DOCUMENTS

JP 2000-061293 2/2000

* cited by examiner

*Primary Examiner*—Zakiya W. Bates
(74) *Attorney, Agent, or Firm*—Kameron D. Kelly; Ryan N. Cross

(57) ABSTRACT

A method for releasing gas from a gas hydrate without melting the gas hydrate by substituting the gas with a releasing agent that forms a more stable hydrate structure than the gas.

50 Claims, 2 Drawing Sheets

PRODUCTION OF FREE GAS BY GAS HYDRATE CONVERSION

BACKGROUND OF THE INVENTION

1. Field of the Invention

Figure 1:
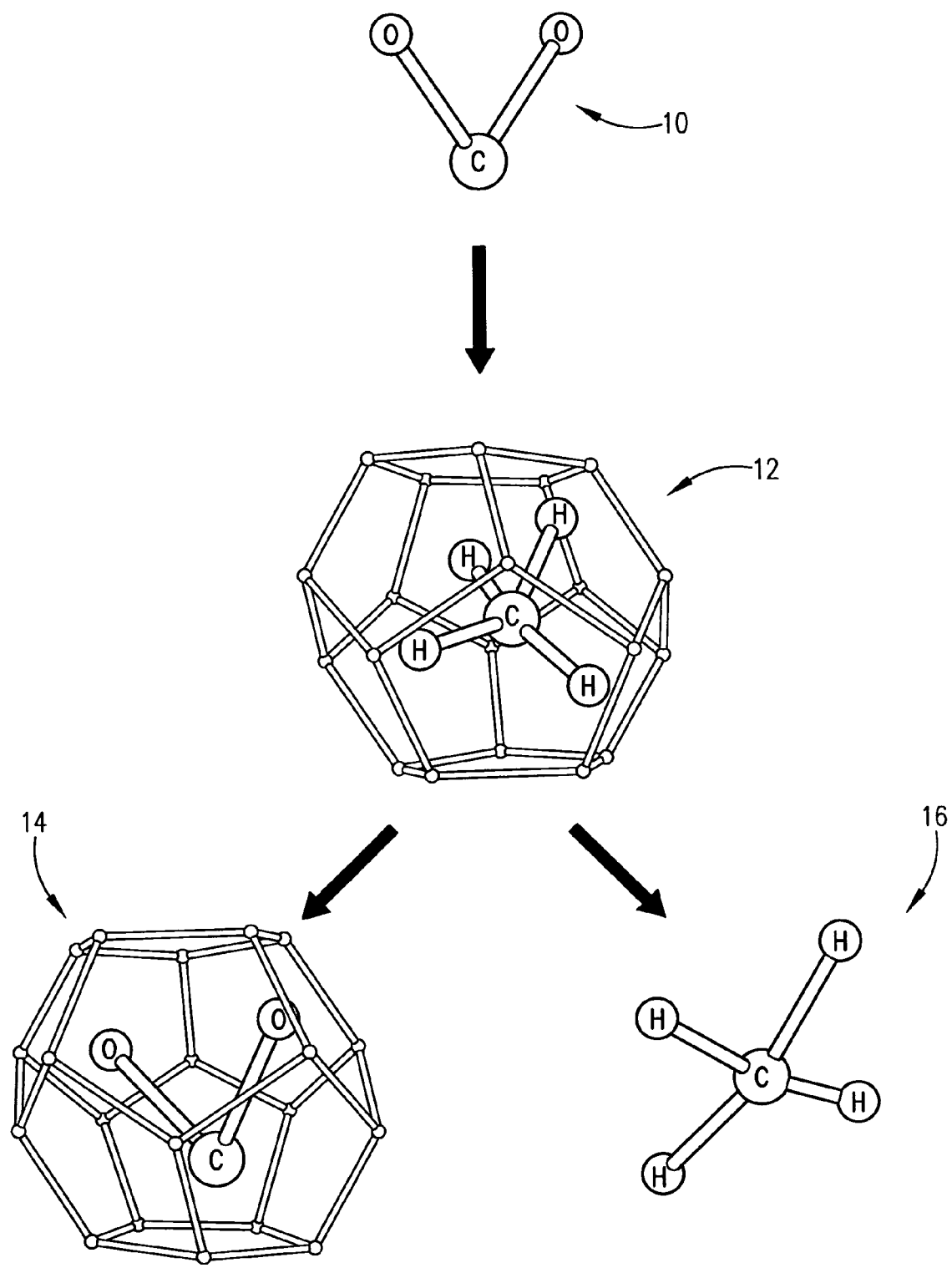

One aspect of this invention relates to the production of hydrocarbons from subterranean formations. In another aspect, the invention concerns a method of recovering free gas from naturally-occurring gas hydrate deposits. In a further aspect, the invention involves a process of sequestering greenhouse gases in subterranean formations.

2. Description of the Prior Art

Gas hydrates are crystalline solids composed of gas molecules surrounded by cages of water molecules. These gas molecules are usually light hydrocarbons (C1–C4). Gas hydrates form a solid phase above and below the pressure and temperature conditions required to form ice. Gas hydrates historically have been considered a nuisance in the oil industry because of their spontaneous formation in oil and gas pipelines, which would hamper the flow of oil within the pipeline.

However, naturally-occurring gas hydrate deposits have become the focus of attention in recent years as an alternative fuel source for the energy industry. Large, naturally-occurring gas hydrate deposits are found near many existing oil deposits, along with non-traditional reservoirs found in permafrost and shallow buried sediments in deep-sea environments. Some sources estimate that in the United States alone, the amount of methane contained within natural methane hydrate deposits is 200 times the amount existing as free methane in natural gas deposits. Furthermore, the amount of potential energy in natural gas hydrate deposits is estimated to be twice that of the currently existing oil, coal, and natural gas deposits combined.

Conventional methods of natural gas extraction from gas hydrates involve heating and/or depressurizing the gas hydrates in order to release the natural gas. However, there are two major problems with these conventional methods. First, they require a large amount of energy to be added to the system, resulting in a high cost of extraction. Second, they destabilize hydrate formations because both depressurization and heating cause the hydrate to melt. This can lead to the destabilization and/or collapse of sediments that contain hydrates and other nearby subterranean formations. Because gas hydrates are usually extracted near oil and natural gas deposits, such instability can result in problems with the extraction of oil and natural gas.

An existing problem, unrelated to the extraction of gas hydrates, concerns the release of greenhouse gases into the Earth's atmosphere. A variety of current industrial processes produce excess greenhouse gases, especially carbon dioxide, that may contribute to the catastrophic climate changes if continually released into the atmosphere. However, disposal of the excess greenhouse gases in a manner that permanently prevents release of the gases can be quite expensive. Thus, it would be desirable to provide a new method of sequestering greenhouse gases, such as carbon dioxide, that is more effective and economical than previous disposal methods.

OBJECTS AND SUMMARY OF THE INVENTION

Responsive to these and other problems, an object of the present invention is to provide a more efficient and effective method for recovering gas from natural gas hydrates.

A further object of the present invention is to provide a method of recovering gas from natural gas hydrates that does not require significant heating or depressurization of the natural gas hydrates.

Another object of the present invention is to provide a method of recovering gas from natural gas hydrates that does not destabilize the hydrate formation.

A still further object of the present invention is to provide a method for permanently sequestering large quantities of carbon dioxide.

It should be noted that not all of the above-listed objects need be accomplished by the invention claimed herein and other objects and advantages of this invention will be apparent from the following description of the invention and appended claims.

In accordance with one embodiment of the present invention, there is provided a process that releases hydrocarbons from a natural gas hydrate formation without significant melting of the natural gas hydrate formation.

In accordance with another embodiment of the invention, there is provided a method for releasing hydrocarbons from a gas hydrate comprising a hydrocarbon bound with solid-state water. The inventive method includes substituting a releasing agent for the hydrocarbon to release the hydrocarbon from the solid-state water, thereby providing a substituted hydrate comprising the releasing agent bound with the solid-state water.

In accordance with still another embodiment of the invention, there is provided a method for producing hydrocarbons from subterranean gas hydrates located proximate to a subterranean channel. The method includes (a) introducing a releasing agent into the subterranean channel; (b) causing the releasing agent to contact the gas hydrate, thereby releasing a hydrocarbon into the channel without melting the gas hydrate; and (c) recovering the released hydrocarbon from the channel.

BRIEF DESCRIPTION OF THE DRAWING FIGURES

Figure 2:
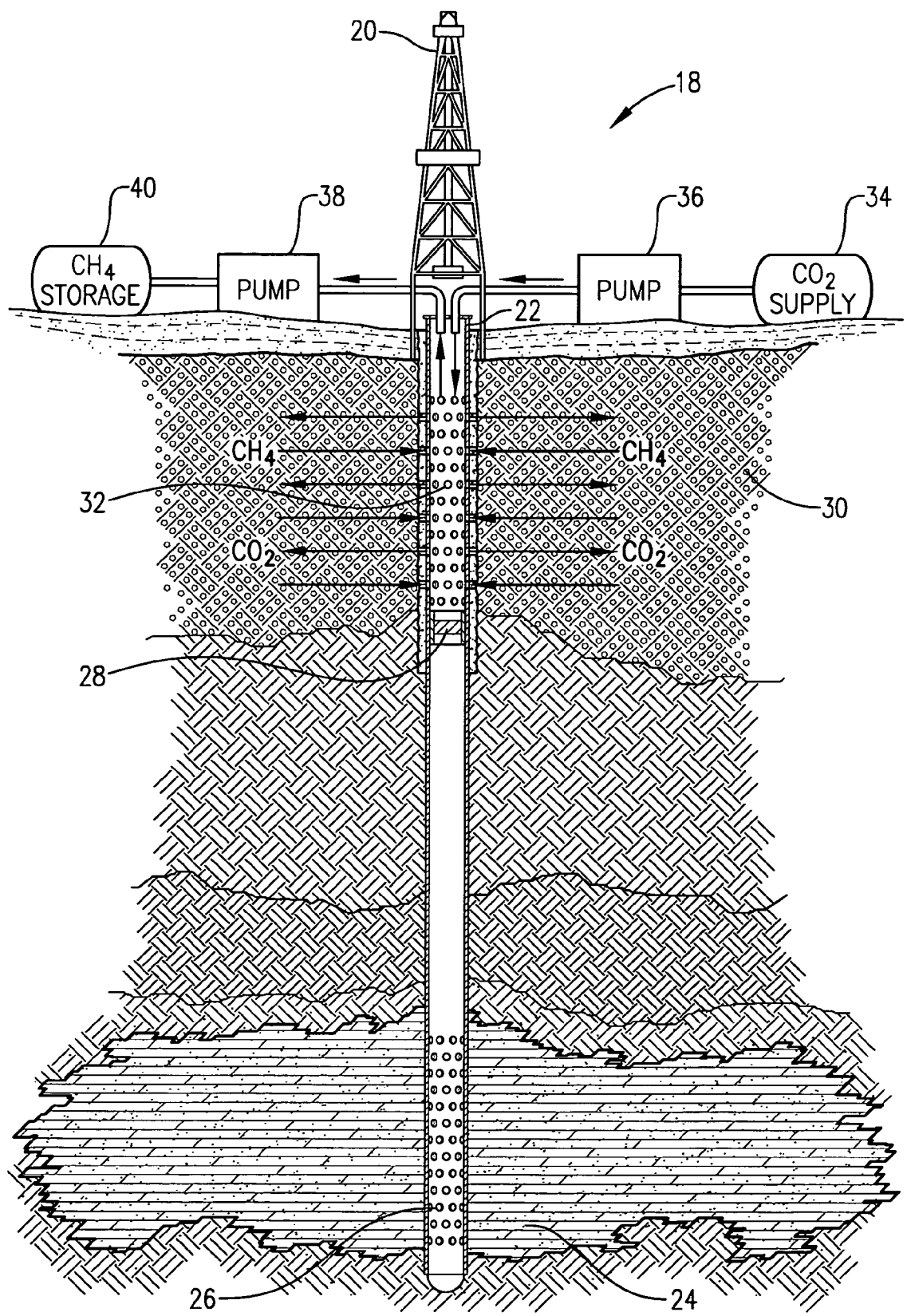

Preferred embodiments of the invention are described in detail below with reference to the attached drawing figures, wherein:

FIG. 1 is a diagram illustrating schematically the substitution of a carbon dioxide releasing agent for methane in a methane hydrate, thereby producing a carbon dioxide hydrate and free methane; and FIG. 2 is a diagram showing an embodiment of the invention used to release gas from a hydrate formation located proximate to an oil or natural gas well.

DETAILED DESCRIPTION OF THE PREFERRED EMBODIMENTS

In accordance with the present invention, gas is removed from a gas hydrate by contacting the hydrate with a releasing agent. When the releasing agent contacts the gas hydrate, the releasing agent spontaneously replaces the gas within the hydrate structure. This spontaneous substitution of the releasing agent for the gas in the hydrate structure frees the gas from the hydrate structure without melting the hydrate structure.

The gas hydrate contacted with the releasing agent preferably comprises a hydrocarbon bound within solid-state water. More preferably, the gas hydrate is a light hydrocarbon (C1–C4) hydrate. Most preferably, the gas hydrate is a methane hydrate. In one embodiment, the gas hydrate is a naturally-occurring hydrate contained within a porous subterranean formation. This formation could include porous rock or sediments that are associated with the proper pressure and temperature conditions necessary to form natural gas hydrates.

The releasing agent contacted with the gas hydrate is preferably a compound that forms a more thermodynamically stable hydrate structure than the gas originally contained within the hydrate structure, so the releasing agent spontaneously (i.e., without the need for added energy) replaces the gas within the hydrate without requiring a significant change in the temperature, pressure, or volume of the hydrate. The releasing agent hydrate, consisting of the releasing agent bound with solid-state water, is more thermodynamically stable than the original natural gas hydrate if the reaction which substitutes the releasing agent for the gas favors the formation of the releasing agent hydrate. The thermodynamic stability of the original natural gas hydrate and the releasing agent hydrate can be compared by calculating the Gibbs free energy value of the formation of each hydrate based on the heat of formation of the gas hydrate and the releasing agent hydrate at the natural conditions of the gas hydrate. If the Gibbs free energy value for the formation of the releasing agent hydrate is less than the Gibbs free energy value for the formation of the gas hydrate, then the reaction favors the releasing agent. Preferably, the Gibbs free energy value favors the formation of the releasing agent hydrate by at least about 2% over the formation of the gas hydrate, more preferably by at least about 5%, and most preferably by at least 10%. This replacement of the gas in the hydrate structure with the releasing agent frees the gas from the hydrate.

The relative thermodynamic stability of a releasing agent hydrate can also be determined by comparing its temperature and pressure stability ranges with that of the gas hydrate. If the releasing agent hydrate, at constant pressure, is stable at higher temperatures than the gas hydrate, and if at a constant temperature, the releasing hydrate is stable at lower pressures than the gas hydrate, then the releasing agent forms a thermodynamically more stable hydrate structure than the gas does. Thus, the use of such a releasing agent that forms a thermodynamically more stable hydrate can permit release of the gas without melting the hydrate and without destabilizing the hydrate structure. As a result, any temperature or pressure changes of the hydrate structure will be minimal, most likely less than 10% on a Celsius temperature scale and less than 10% on a Pascal pressure scale. In addition, since little or no melting of the hydrate occurs during replacement of the original gas with the releasing agent, any volume change will be minimal, most likely less than 10%.

The releasing agent contacting the gas hydrate is preferably a small, polar molecule whose size and chemical interaction with water molecules of the hydrate are such that the releasing agent forms the same or a similar hydrate structure as methane hydrate. The releasing agent is also preferably in the liquid phase when contacted with the gas hydrate. Preferably, the releasing agent has a molecular diameter in the range of from about 1 to about 8 angstroms, more preferably from 2 to 5 angstroms. It is further preferred that the molecular diameter of the releasing agent is within about 100% of the molecular diameter of methane, more preferably within 50% of the molecular diameter of methane. The releasing agent is preferably selected from the group consisting of carbon dioxide, nitrous oxide, and mixtures thereof. Most preferably, the releasing agent is carbon dioxide in the liquid phase. Mixtures of carbon dioxide with small amounts of other gases such as nitrogen, helium, and neon may also be used as the releasing agent. However, it is preferred for the releasing agent contacted with the gas hydrate to comprise at least about 50 mole percent carbon dioxide, more preferably at least 90 mole percent carbon dioxide. When the natural gas hydrate is contacted with the releasing agent, it is preferred that the releasing agent is at or near the same temperature as the original, natural gas hydrate, preferably within about 10° C. of the original natural gas hydrate temperature.

Referring now to FIG. 1, in a preferred embodiment of the inventive method, liquid carbon dioxide 10 is contacted with a methane hydrate 12, which results in the formation of a carbon dioxide hydrate 14 and the release of free methane 16 without melting the hydrate. Not wishing to be bound to theory, it is believed this reaction occurs spontaneously because the Gibbs free energy value for the substitution of carbon dioxide for methane within the hydrate favors the carbon dioxide hydrate by several kcal/mole, based on the heat of formation for both hydrates at standard temperature and pressure.

The present invention can be applied to the system represented in FIG. 2. FIG. 2 illustrates an oil or natural gas well 18 that has been modified to employ the present inventive methodology. Well 18 generally comprises a superstructure 20 and a casing 22. Well 18 was previously used to produce oil and/or gas from a subterranean reservoir 24 via lower perforations 26 in casing 22. After production of the oil and/or gas from subterranean formation 24 has been completed, a plug 28 is inserted into casing 22 above perforations 26 and immediately below a methane hydrate formation 30. Upper perforations 32 are created in casing 22 above plug 28 and proximate to hydrate formation 30. Once plug 28 and perforations 32 are in place, liquid carbon dioxide from carbon dioxide supply 34 can be introduced into casing 22 via a carbon dioxide pump 36. The liquid carbon dioxide introduced into casing 22 is then discharged from casing 22 and into hydrate formation 30 via upper perforations 32. As described in detail above, when the carbon dioxide contacts the methane hydrates of hydrate formation 30, the carbon dioxide molecules are spontaneously substituted for the methane molecules in the hydrate structure, thereby releasing free methane gas without melting hydrate formation 30. The released free methane gas flows back towards casing 22 and enters casing 22 via perforations 32. The released methane gas can then be evacuated from casing 22 using a methane pump 38. The recovered methane gas can be stored on site in methane storage 40 or can be immediately transported off site for further processing. The carbon dioxide used to replace/release the methane is permanently sequestered in the subterranean hydrate formation.

The steps of injecting carbon dioxide into hydrate formation 30 and recovering the released methane can be repeated until the quantity of free methane gas recovered falls to a level that makes further recovery economically unfeasible. The above steps are preferably repeated until substantially all of the methane within the hydrate formation has been recovered. Because carbon dioxide is thermodynamically preferred to the methane within the hydrate formation, the formation does not have to be depressurized or heated in order to recover the methane. Consequently, the hydrate within the formation will not melt, and no destabilization of the hydrate formation will occur.

The description provided above with reference to FIG. 2 describes a method for methane recover from natural gas hydrates in association with an existing, depleted oil or natural gas well. It should be understood that the inventive system can readily be employed to recover methane from natural gas hydrates before production of oil and natural gas at the well location. Further, the inventive system could be used to recover methane from natural gas hydrates without any associated oil or natural gas production.

While this invention has been described in terms of the presently preferred embodiments, reasonable variations and modifications are possible to those skilled in the art and such variations are within the scope of the described invention and the appended claims.

What is claimed is:

1. A process comprising:
    (a) releasing a hydrocarbon from a gas hydrate without melting the gas hydrate,
    (b) collecting the released hydrocarbon,
    wherein step (a) includes contacting the gas hydrate with a releasing agent to thereby form a substituted hydrate comprising the releasing agent bound with solid-state water.
2. The process of claim 1, wherein the gas hydrate is methane hydrate and the hydrocarbon is methane.
3. The process of claim 1, wherein step (b) is performed without melting the gas hydrate.
4. The process of claim 1, wherein step (b) is performed without melting the substituted hydrate.
5. The process of claim 1, wherein the releasing agent is a polar molecule having a molecular diameter in the range from of about 1 to about 8 angstroms.
6. The process of claim 1, wherein the releasing agent is a polar molecule having a molecular diameter within about 100% of the molecular diameter of methane.
7. The process of claim 6, wherein the polar molecule forms a more stable hydrate than the hydrocarbon.
8. The process of claim 7, wherein the Gibbs free energy value favors the formation of the substituted hydrate by at least about 2% over the formation of the gas hydrate.
9. The process of claim 1, wherein the releasing agent is selected from the group consisting of carbon dioxide, nitrous oxide, and mixtures thereof.
10. The process of claim 9, wherein the releasing agent comprises carbon dioxide.
11. The process of claim 1, wherein the releasing agent is in liquid phase when contacted with the gas hydrate.
12. The process of claim 1, wherein the releasing agent is liquid phase carbon dioxide.
13. The process of claim 1, wherein step (a) is performed without raising the temperature of the gas hydrate by more than 10% on a Celsius temperature scale.
14. The process of claim 1, wherein step (a) is performed without changing the pressure conditions of the gas hydrate by more than 10% on a Pascal pressure scale.
15. A method for releasing hydrocarbons from a gas hydrate, said gas hydrate comprising a hydrocarbon bound with solid-state water, said method comprising:
    (a) substituting a releasing agent for the hydrocarbon to thereby release the hydrocarbon from the solid-state water without melting the gas hydrate, thereby providing a substituted hydrate comprising the releasing agent bound with the solid-state water.
16. The method of claim 15, wherein the substituted hydrate is more stable than the gas hydrate.
17. The method of claim 16, wherein the Gibbs free energy value favors the formation of the substituted hydrate by at least about 2% over the formation of the gas hydrate.
18. The method of claim 15, wherein the releasing agent is a polar molecule.
19. The method of claim 18, wherein the releasing agent has a molecular diameter in the range of from about 1 to about 8 angstroms.
20. The method of claim 15, wherein the gas hydrate is methane hydrate and the hydrocarbon is methane.
21. The method of claim 20, wherein the releasing agent is a polar molecule having a molecular diameter within about 100% of the molecular diameter of methane.
22. The method of claim 15, wherein the releasing agent is selected from the group consisting of carbon dioxide, nitrous oxide, and mixtures thereof.
23. The method of claim 15, wherein the releasing agent comprises carbon dioxide.
24. The method of claim 15, further comprising:
    (b) collecting the released hydrocarbon.
25. The method of claim 24, wherein step (b) is performed without melting the substituted hydrate.
26. The method of claim 15, wherein the releasing agent is in liquid phase when contacted with the gas hydrate.
27. The method of claim 15, wherein the releasing agent is liquid phase carbon dioxide.
28. The method of claim 15, wherein step (a) is performed without changing the temperature of the gas hydrate by more than 10% on a Celsius temperature scale.
29. The method of claim 15, wherein step (a) is performed without changing the pressure conditions of the gas hydrate by more than 10% on a Pascal pressure scale.
30. A method for producing hydrocarbons from subterranean gas hydrates located proximate a subterranean channel, said method comprising:
    (a) introducing a releasing agent into the subterranean channel;
    (b) causing the releasing agent to contact the gas hydrate, thereby releasing a hydrocarbon into the channel without melting the gas hydrate; and
    (c) recovering the released hydrocarbon from the channel.
31. The method of claim 30, wherein the gas hydrate is methane hydrate and the hydrocarbon is methane.
32. The method of claim 31, wherein the releasing agent is a polar molecule having a molecular diameter within 100% of the molecular diameter of methane.
33. The method of claim 32, wherein the polar molecule forms a substituted hydrate that is more stable than the hydrocarbon.
34. The method of claim 33, wherein the Gibbs free energy value favors the formation of the substituted hydrate by at least about 2% over the formation of the gas hydrate.
35. The method of claim 30, wherein the releasing agent is a polar molecule having a molecular diameter in the range of from about 1 to about 8 angstroms.
36. The method of claim 30, wherein the releasing agent comprises carbon dioxide.
37. The method of claim 30, wherein the releasing agent is in liquid phase when contacted with the gas hydrate.
38. The method of claim 30, wherein the releasing agent is liquid phase carbon dioxide.
39. The method of claim 30, wherein step (b) is performed without changing the temperature of the gas hydrate by more than 10% on a Celsius temperature scale.
40. The method of claim 30, wherein step (b) is performed without changing the pressure conditions of the gas hydrate by more than 10% on a Pascal pressure scale.
41. A method of sequestering carbon dioxide, said method comprising:
    (a) introducing carbon dioxide into a subterranean formation comprising a gas hydrate; and (b) contacting at least a portion of the carbon dioxide with at least a portion of the gas hydrate under conditions sufficient to form a carbon dioxide hydrate without melting the gas hydrate.

42. The method of claim 41, wherein the gas hydrate is methane hydrate.

43. The method of claim 41, wherein at least a portion of the carbon dioxide is in the liquid phase during step (a) and/or step (b).

44. The method of claim 41, wherein said carbon dioxide is maintained in the liquid phase during steps (a) and (b).

45. The method of claim 41, wherein the gas hydrate comprises a hydrocarbon bound in solid-state water, and wherein step (b) includes substituting carbon dioxide for the hydrocarbon to thereby form the carbon dioxide hydrate.

46. The method of claim 45, wherein step (b) includes releasing the hydrocarbon from the solid-state water.

47. The method of claim 46, wherein the released hydrocarbon is methane.

48. The method of claim 46, further comprising:
(c) collecting the released hydrocarbon.

49. The method of claim 41, wherein step (b) is performed without changing the temperature of the gas hydrate by more than 10% on a Celsius temperature scale.

50. The method of claim 41, wherein step (b) is performed without changing the pressure conditions of to gas hydrate by more than 10% on a Pascal pressure scale.

* * * * *

UNITED STATES PATENT AND TRADEMARK OFFICE
CERTIFICATE OF CORRECTION

PATENT NO. : 7,222,673 B2  Page 1 of 1
APPLICATION NO. : 10/948431
DATED : May 29, 2007
INVENTOR(S) : Graue et al.

It is certified that error appears in the above-identified patent and that said Letters Patent is hereby corrected as shown below:

Col. 5, line 33, "claim 6" should read -- claim 4 --.
Col. 5, line 63, "claim 16" should read -- claim 14 --.
Col. 8, line 12, "to" should read -- the --.

Signed and Sealed this

Seventh Day of August, 2007

JON W. DUDAS
*Director of the United States Patent and Trademark Office*